US010834807B1

(12) United States Patent
Wiederin et al.

(10) Patent No.: US 10,834,807 B1
(45) Date of Patent: Nov. 10, 2020

(54) ICP TORCH ASSEMBLY WITH RETRACTABLE INJECTOR

(71) Applicant: Elemental Scientific, Inc., Omaha, NE (US)

(72) Inventors: Daniel R. Wiederin, Omaha, NE (US); Gary J. Barrett, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 136 days.

(21) Appl. No.: 15/476,146

(22) Filed: Mar. 31, 2017

Related U.S. Application Data

(60) Provisional application No. 62/316,662, filed on Apr. 1, 2016.

(51) Int. Cl.
*B23K 10/00* (2006.01)
*H05H 1/26* (2006.01)

(52) U.S. Cl.
CPC .................................... *H05H 1/26* (2013.01)

(58) Field of Classification Search
CPC ............... H05H 1/30; H05H 1/34; H05H 1/26
USPC .............. 219/121.5, 121.51, 121.52, 121.48; 315/111.51
See application file for complete search history.

(56) References Cited

U.S. PATENT DOCUMENTS 4,482,246 A * 11/1984 Meyer .................... G01N 21/73 219/121.48
4,766,287 A * 8/1988 Morrisroe ................ H05H 1/30 219/121.48
5,012,065 A * 4/1991 Rayson .................... H05H 1/30 219/121.48
5,016,683 A * 5/1991 Latka .................. B01F 15/0218 141/1
5,083,004 A * 1/1992 Wells ....................... H05H 1/30 219/121.5
5,186,621 A * 2/1993 Pennington .......... G01N 21/714 356/315
5,233,156 A * 8/1993 Chan ........................ H05H 1/42 219/121.5
5,483,337 A * 1/1996 Barnard ................. G01N 21/68 356/316
5,705,787 A * 1/1998 Karanassios ............. H05H 1/42 219/121.43
6,899,787 B2 * 5/2005 Nakano ............ H01J 37/32082 118/723 AN
7,163,603 B2 * 1/2007 Fink ...................... H01J 37/321 118/723 I
7,572,999 B2 * 8/2009 Tao .................... G01N 30/7206 219/121.51
7,847,210 B2 * 12/2010 Brezni ..................... H05H 1/30 219/121.36
8,063,337 B1 * 11/2011 Wiederin .............. H01J 49/105 219/121.43

(Continued)

*Primary Examiner* — Mark H Paschall
(74) *Attorney, Agent, or Firm* — Kevin E. West; Advent, LLP

(57) ABSTRACT

A plasma torch assembly (e.g., for an ICP-MS or ICP-AES instrument) with a retractable injector is disclosed. In implementations, the torch assembly includes an injector that can be extended or retracted relative to an auxiliary gas tube of the torch assembly. The injector can be slidably coupled to a torch body that supports the auxiliary gas tube, such that the injector can be moved forward and backward through a passage of the torch body, causing it to extend/retract relative to the auxiliary gas tube.

17 Claims, 4 Drawing Sheets

(56) References Cited

U.S. PATENT DOCUMENTS

| | | | | |
|---|---|---|---|---|
| 10,285,255 | B2 * | 5/2019 | Sharp | G01N 1/28 |
| 10,390,417 | B2 * | 8/2019 | Brezni | H05H 1/0037 |
| 2006/0024199 | A1 * | 2/2006 | Tao | G01N 30/7206<br>422/54 |

* cited by examiner

ICP TORCH ASSEMBLY WITH RETRACTABLE INJECTOR

CROSS-REFERENCE TO RELATED APPLICATIONS

The present application claims the benefit under 35 U.S.C. § 119(e) of U.S. Provisional Application Ser. No. 62/316,662, filed Apr. 1, 2017, and titled "ICP TORCH ASSEMBLY WITH RETRACTABLE INJECTOR," which is incorporated herein by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. Prior or during transportation of the aliquot to the nebulizer, the sample aliquot may be mixed with hydride generation reagents and fed into a hydride gas/liquid separator that channels hydride and/or sample gas into the nebulizer. The aerosol generated by the nebulizer is then sorted in a spray chamber to remove the larger aerosol particles. Upon leaving the spray chamber, the aerosol is introduced into the plasma by a plasma torch assembly of the ICP-MS or ICP-AES instruments for analysis. The plasma torch assembly includes an injector for transferring the aerosol from the spray chamber to the analysis site (i.e., into the plasma).

SUMMARY

A plasma torch assembly (e.g., for an ICP-MS or ICP-AES instrument) with a retractable injector is disclosed. Variably extending or retracting the injector relative to an auxiliary tube of the torch assembly can be advantageous in certain situations. For example, the torch can be used with a retracted injector when samples with high levels of dissolved solids (<0.1% W/W) are analyzed for increased residence time in the ICP. As another example, when the torch is used with volatile samples, such as organic solvents or solutions with high concentrations of ammonia, it can be operated with the injector in a more extended configuration (e.g., fully extended) to ensure plasma stability.

In embodiments, the torch assembly includes a torch body, an auxiliary tube supported by the torch body, and an injector adjustable to extend or retract relative to the auxiliary tube. The injector can comprise an injector body and an injector tube mounted to the injector body, wherein the injector tube is slidable within a passage of the torch body. The injector body can be actuated to slide the injector tube forward or backward within the passage of the torch body. For example, the injector body may include a threaded portion that is receivable by a threaded coupling for connecting the injector with the torch body, wherein the injector tube is actuatable by rotating the injector body relative to the threaded coupling. The torch assembly also includes an airtight seal between the injector and the torch body to isolate the torch from environmental air external to the torch. In some embodiments, the physical dimensions of the injector body and the passage of the torch body establish the airtight seal when the injector body is coupled to the torch body. In other embodiments, the airtight seal can be formed by a seal element that is coupled to the injector, where the seal element is slidable within the passage of the torch body to maintain the airtight seal when the injector tube is extended/retracted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
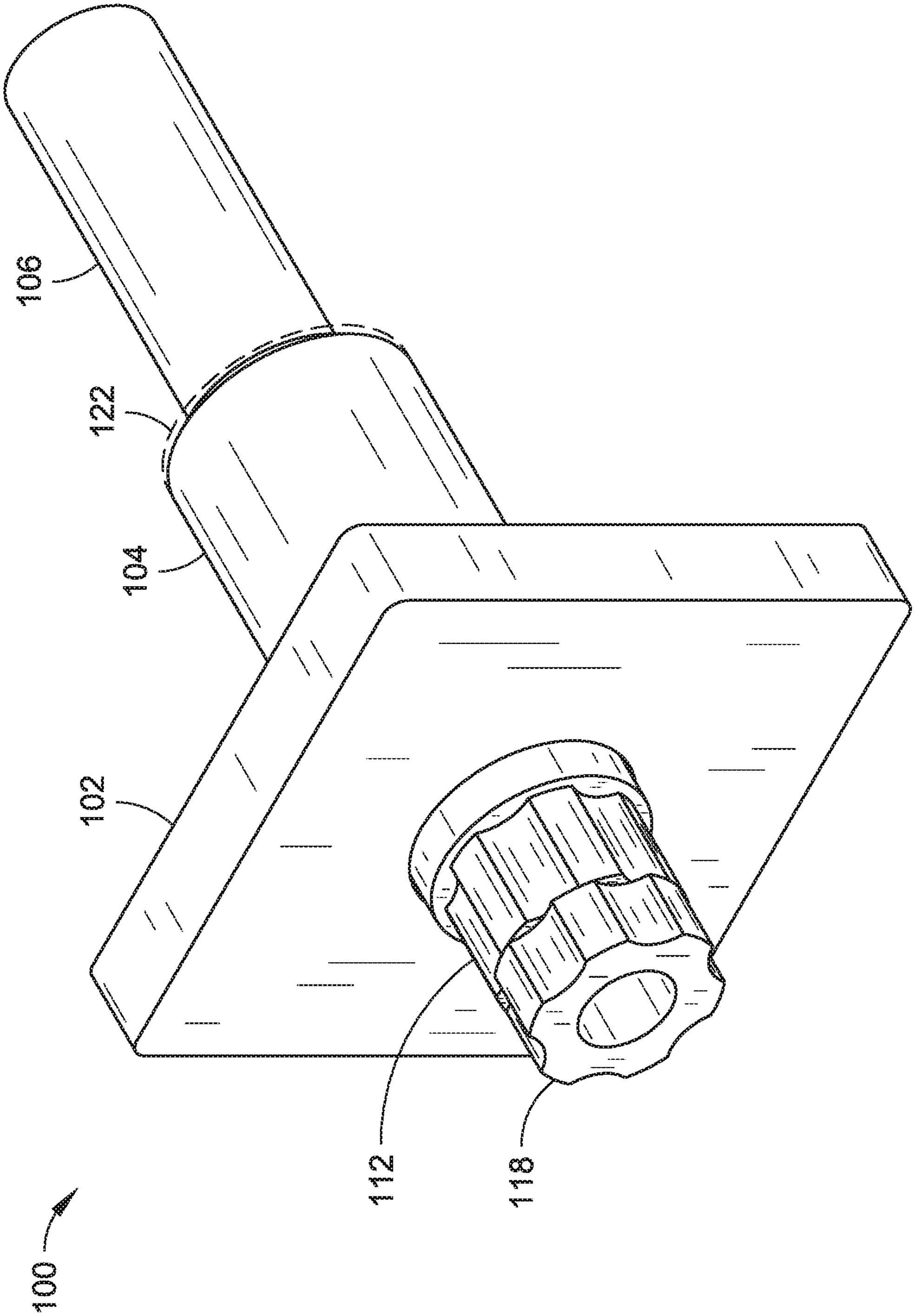
FIG. 1 is a perspective view of a torch assembly with a retractable injector, in accordance with an embodiment of this disclosure.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. Prior or during transportation of the aliquot to the nebulizer, the sample aliquot may be mixed with hydride generation reagents and fed into a hydride gas/liquid separator that channels hydride and/or sample gas into the nebulizer. The aerosol generated by the nebulizer is then sorted in a spray chamber to remove the larger aerosol particles. Upon leaving the spray chamber, the aerosol is introduced into the plasma by a plasma torch assembly of the ICP instrument for analysis.

A plasma torch assembly with a retractable injector is disclosed herein. Having the ability to variably extend or retract the injector relative to an auxiliary tube of the torch assembly can be advantageous in certain situations. For example, the torch can be used with a retracted injector when samples with high levels of dissolved solids (<0.1% W/W) are analyzed for increased residence time in the ICP. As another example, when the torch is used with volatile samples, such as organic solvents or solutions with high concentrations of ammonia, it can be operated with the injector in a more extended configuration (e.g., fully extended) to ensure plasma stability.

Example Implementations

FIGS. 1 through 4 illustrate a torch assembly 100 with a retractable injector in accordance with various embodiments of this disclosure. Those skilled in the art will appreciate that the embodiments illustrated in the drawings and/or described herein may be modified or fully or partially combined to result in additional embodiments. Accordingly, the illustrated and described embodiments should be understood as explanatory and not as limitations of the present disclosure.

According to various embodiments, the torch assembly 100 includes a torch body 104, an auxiliary tube 108 supported by the torch body 104, and an injector adjustable to extend or retract relative to the auxiliary tube 108. The injector can comprise an injector body 118 and an injector tube 120 mounted to the injector body 118, wherein the injector tube 120 is slidable within a passage of the torch body 104. The injector body 118 can be actuated to slide the injector tube 120 forward or backward within the passage of the torch body 104, causing the tip of the injector tube 120 to extend or retract relative to an auxiliary tube 108 situated around the injector tube 120. The injector body 118 and the torch body 104 can be formed from a plastic or polymer material. The injector tube 120 and the auxiliary tube 108 and outer tube 106 of the torch assembly 100 can be formed from a glass or glass-like material that is heat resistant and/or corrosive resistant.

In some embodiments, the torch assembly 100 may include a substantially flat disc shaped (e.g., washer-like) shielding element 122 (FIG. 1) having a central aperture disposed around the outer most tube 106 of the torch assembly 100 to protect the torch body 104 from heat, light, or particle emissions. The shielding element 122 can be heat resistant and corrosive resistant. For example, the shielding element 122 can include a fluoropolymer such as polytetrafluoroethylene (PTFE) (e.g., TEFLON) or the like. Additional examples of possible material(s)/structure(s) for the shielding element are described in U.S. Pat. No. 8,063,337 which is incorporated herein by reference in its entirety.

The injector body 118 can include a threaded portion 116 that is receivable by a threaded coupling 112 for connecting the injector body 118 with the torch body 104. For example, the threaded portion 116 can be cooperatively threaded with a threaded portion 124 of the threaded coupling 112, where the injector tube 120 is actuatable by rotating the injector body 118 relative to the threaded coupling 112. When the injector body 118 is turned in a first direction, the injector body 118 is brought into tighter contact with the threaded coupling 112, thereby moving the injector tube 120 to a more extended or less retracted position with respect to the auxiliary tube 108. When the injector body 118 is turned in a second (opposite) direction, the injector body 118 loosened with respect to the threaded coupling 112, thereby moving the injector tube 120 to a retracted or less extended or more retracted position with respect to the auxiliary tube 108.

Figure 4:
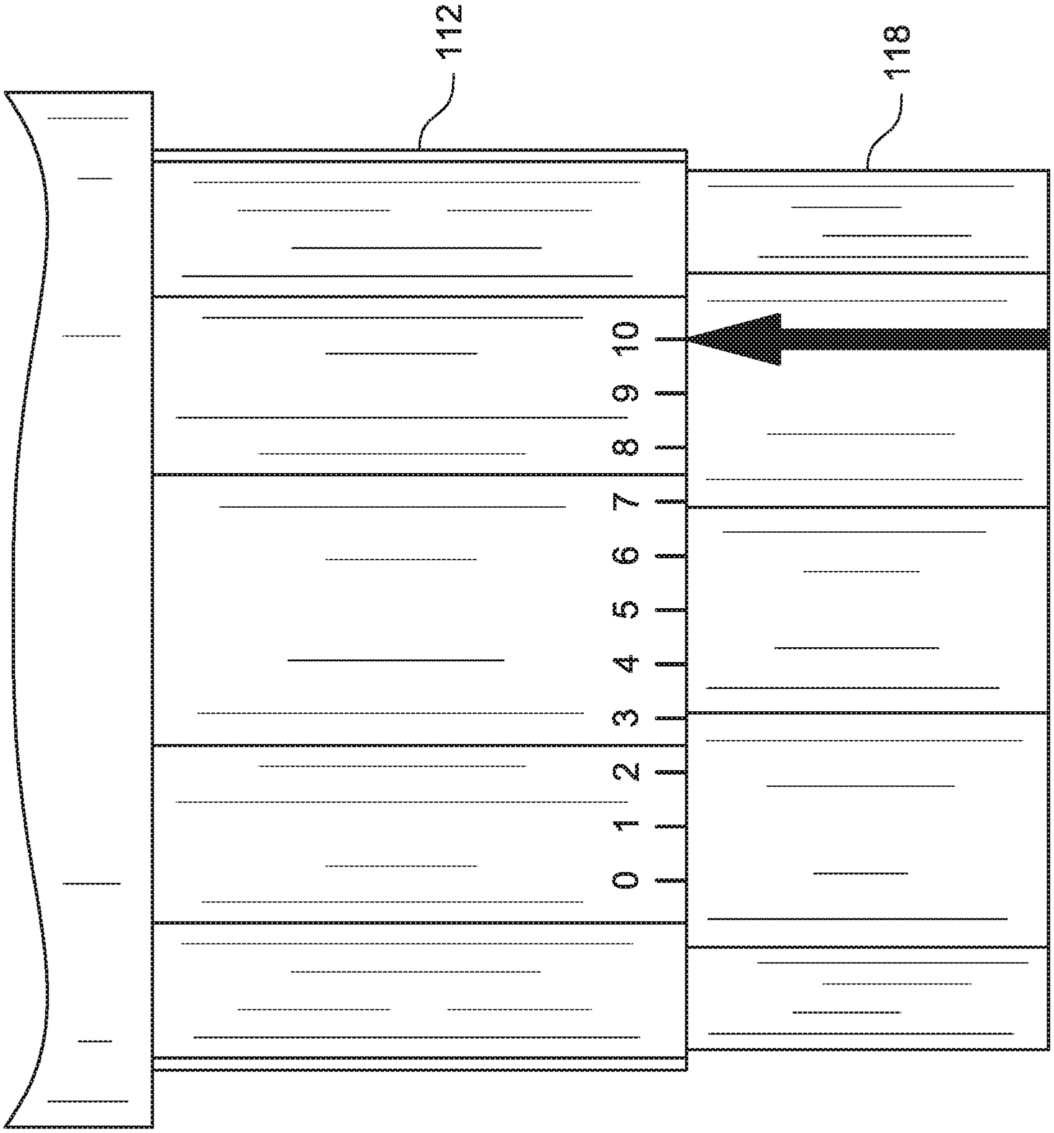
FIG. 4 is a top view of a coupling interface between a torch body and an injector body of the torch assembly shown in FIG. 1, wherein the coupling interface includes a scale with indicia corresponding to a position of the injector that is controlled by rotation of the injector body relative to the torch body.

In some embodiments, the injector body 118 and threaded coupling 112 have fine pitched threading at threaded portions 116 and 124 for accurate positioning of the injector tube 120. For example, the threading can correspond to predetermined positions of the injector tube 120. In some embodiments, a scale printed or etched in proximity of the coupling interface (e.g., between the injector body 118 and the threaded coupling 112). For example, the scale can comprise indicia (e.g., markings) printed or etched on one or more of the components (e.g., as shown in FIG. 4), where the indicia correspond to positions or levels of extension/retraction of the injector tube 120. In an example shown in FIG. 4, the scale is printed along at least a portion of the circumference of the threaded coupling 112 and/or the injector body 118 such that rotating the injector body 118 relative to the threaded coupling 112 causes the position or level of extension/retraction of the injector tube 120 to be set based on positioning of the indicia.

Figure 2:
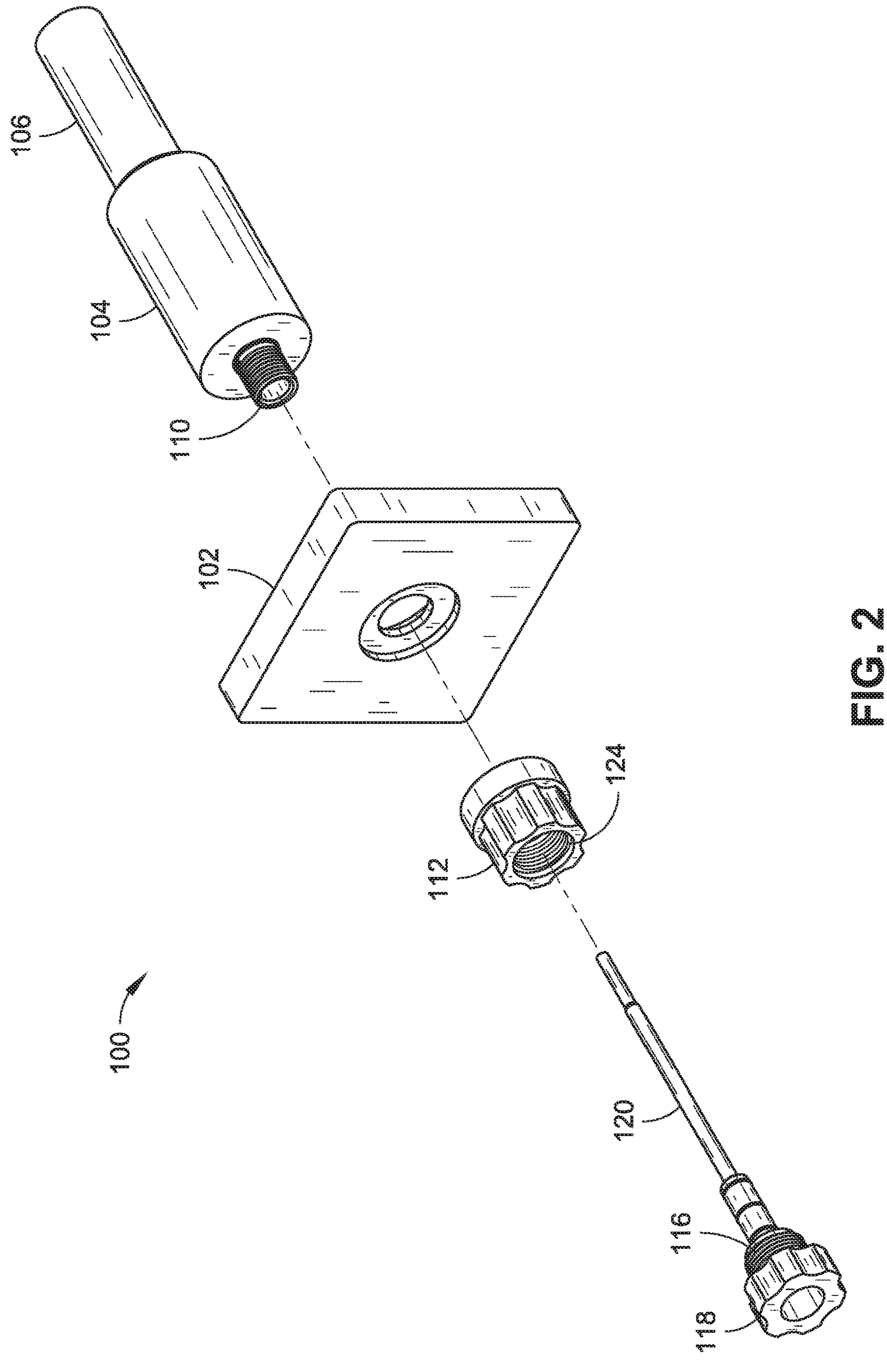
FIG. 2 is an exploded perspective view of the torch assembly shown in FIG. 1.
Figure 3:
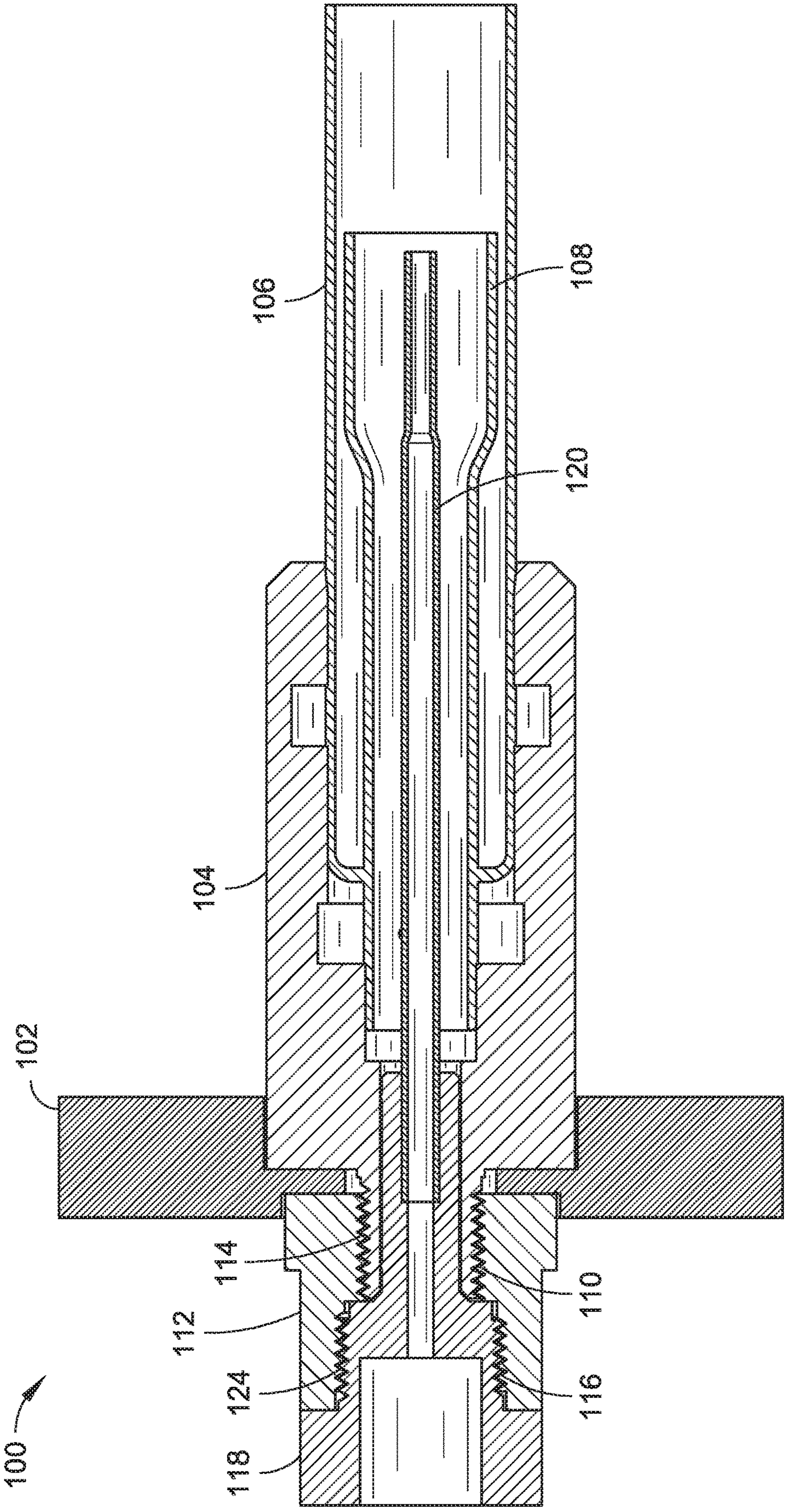
FIG. 3 is a cross-sectional side view of the torch assembly shown in FIG. 1.

The threaded coupling 112 can be part of the torch body 104, or it can be distinct from the torch body 104 as illustrated in FIGS. 1 through 3. Where the threaded coupling 112 is a distinct component, the torch body 104 can also include a threaded portion 110 that is cooperatively threaded with a second threaded portion 114 of the threaded coupling 112. The torch assembly 100 can also include a supportive base structure 102 between the torch body 104 and the injector body 118. The torch body and the injector may both be removable coupled to the base structure 102. For example, the threaded coupling 112 can receive the threaded portion 110 of the torch body 104 through an aperture of the base structure 102. In this regard, the injector body 118 and the threaded coupling 112 are mountable to a first side of the base structure 102 while the torch body 104 is mountable to a second (opposite) side of the base structure 102. All three of the components (torch body 104, threaded coupling 112, and injector body 118) can be connected along a common axis by effectively screwing the components together. Likewise, the components can also be disconnected (i.e., unscrewed) from each other and from the base structure 102.

The torch assembly 100 also includes an airtight seal between the injector and the torch body 104 to isolate the torch from environmental air external to the torch. In some embodiments, the physical dimensions of the injector body 118 and the passage of the torch body 104 establish the airtight seal when the injector body 118 is coupled to the torch body 104. For example, the injector body 118 and/or the torch body 104 can be tight fit and/or can include ridges, grooves, or other cooperative structural elements that create an airtight seal when they are fit together. In other embodiments, the airtight seal can be formed by a seal element (e.g., polymer washer) that is coupled to the injector, where the seal element is slidable within the passage of the torch body 104 to maintain the airtight seal when the injector tube 120 is extended/retracted. This configuration also allows the components to self-align with one another as a result of the manner by which the components are coupled (i.e., screwed together) along a common axis. In some embodiments, alternative coupling techniques can be implemented, such as snap fitting the components with one another along a common axis. Any such coupling technique can be implemented without departing from the scope of this disclosure.

In some embodiments, the injector tube 120 can be automatically extended/retracted. For example, the torch assembly 100 can further include a motor, servo, or other electronically controlled actuator that rotates the injector body 118 relative to the threaded coupling 112 or otherwise slides the injector tube 120 forward or backwards relative to the auxiliary tube 108. A controller can drive the actuator according to program instructions executable from a non-transitory memory device. The controller can be programmed or otherwise configured to extend or retract the injector tube 120 to a selected position or level or extension/retraction (e.g., a user selected position or a position based on programmed settings for samples/sample solutions being analyzed).

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A torch assembly, comprising:
a torch body;
an auxiliary tube supported by the torch body;
an injector adjustable to extend or retract relative to the auxiliary tube, the injector including an injector body and an injector tube, the injector body defining a threaded body portion;
an outermost tube coaxially surrounding the injector and extending beyond an end of the auxiliary tube; and
a threaded coupling received by the threaded body portion, the threaded coupling connecting the injector body with the torch body, the injector tube adjustable with respect to the auxiliary tube by rotating the injector body relative to the threaded coupling to select a given use position of the injector tube relative to the auxiliary tube.

2. The torch assembly of claim 1, wherein the injector tube is slidable within a passage of the torch body, the injector body being actuatable to slide the injector tube forward or backward within the passage of the torch body.

3. The torch assembly of claim 2, further comprising an airtight seal between the injector and the torch body.

4. The torch assembly of claim 3, wherein the injector body and the passage of the torch body have physical dimensions that cause the injector body and the passage of the torch body to establish the airtight seal when the injector body is coupled to the torch body.

5. The torch assembly of claim 3, wherein the airtight seal is formed by a seal element that is coupled to the injector, the seal element being slidable within the passage of the torch body to maintain the airtight seal when the injector tube is extended/retracted.

6. The torch assembly of claim 1, wherein the threaded coupling includes a fine pitched threading for accurate positioning of the injector tube.

7. The torch assembly of claim 1, wherein the threaded coupling is distinct from the torch body.

8. The torch assembly of claim 7, wherein the torch body includes a threaded portion that is also receivable by the threaded coupling.

9. The torch assembly of claim 1, further comprising a substantially flat disc shaped shielding element, the shielding element including a central aperture and being disposed around the outermost tube that is supported by the torch body.

10. The torch assembly of claim 9, wherein the shielding element comprises a heat resistant and corrosive resistant material.

11. A torch assembly, comprising:
a torch body;
an auxiliary tube supported by the torch body;
an injector adjustable to extend or retract relative to the auxiliary tube, the injector including an injector body and an injector tube, the injector body defining a threaded body portion;
an outermost tube coaxially surrounding the injector and extending beyond an end of the auxiliary tube; and
a threaded coupling received by the threaded body portion, the threaded coupling connecting the injector body with the torch body, the injector tube actuatable with respect to the auxiliary tube by rotating the injector body relative to the threaded coupling; and a scale printed or etched in proximity of an interface between the injector body and the threaded coupling, the scale having indicia corresponding to a position or level of extension/retraction of the injector tube.

12. The torch assembly of claim 11, wherein the scale is printed or etched along at least a portion of the circumference of the threaded coupling or the injector body such that rotating the injector body relative to the threaded coupling causes the position or level of extension/retraction of the injector tube to be set based on positioning of the indicia.

13. A torch assembly, comprising:

a torch body supporting one or more tubes;

an injector adjustable to extend or retract relative to a first one of the one or more tubes, the injector including an injector body and an injector tube, the injector body defining a threaded body portion;

a second one of the one or more tubes coaxially surrounding the injector and extending beyond an end of the first one of the one or more tubes;

a substantially flat disc shaped shielding element, the shielding element including a central aperture and being disposed around the second one of the one or more tubes that is supported by the torch body; and a threaded coupling received by the threaded body portion, the threaded coupling connecting the injector body with the torch body, the injector tube adjustable with respect to the one or more tubes by rotating the injector body relative to the threaded coupling to select a given use position of the injector tube relative to the one or more tubes.

14. The torch assembly of claim 13, wherein the shielding element comprises a heat resistant and corrosive resistant material.

15. The torch assembly of claim 14, wherein the shielding element comprises polytetrafluoroethylene (PTFE).

16. A torch assembly, comprising:

a torch body;

an auxiliary tube supported by the torch body;

an injector adjustable to extend or retract relative to the auxiliary tube, the injector including an injector body and an injector tube, the injector body defining a threaded body portion;

an outermost tube coaxially surrounding the injector and extending beyond an end of the auxiliary tube;

a substantially flat disc shaped shielding element, the shielding element including a central aperture and being disposed around the outermost tube that is supported by the torch body; and a threaded coupling received by the threaded body portion, the threaded coupling connecting the injector body with the torch body, the injector tube adjustable with respect to the auxiliary tube by rotating the injector body relative to the threaded coupling to select a given use position of the injector tube relative to the auxiliary tube.

17. The torch assembly of claim 9, wherein the shielding element comprises polytetrafluoroethylene (PTFE).

* * * * *